US006211636B1

(12) United States Patent
Matsubara et al.

(10) Patent No.: US 6,211,636 B1
(45) Date of Patent: Apr. 3, 2001

(54) PRESSING MACHINE AND MOTOR TORQUE CONTROL METHOD IN PRESSING MACHINE

(75) Inventors: Shunsuke Matsubara, Minamitsuru-gun; Yasusuke Iwashita; Hidekatsu Hamatani, both of Oshino-mura, all of (JP)

(73) Assignee: Fanuc Limited, Yamanashi (JP)

( * ) Notice: Subject to any disclaimer, the term of this patent is extended or adjusted under 35 U.S.C. 154(b) by 0 days.

(21) Appl. No.: 09/155,717

(22) PCT Filed: Mar. 10, 1998

(86) PCT No.: PCT/JP98/00982

§ 371 Date: Oct. 5, 1998

§ 102(e) Date: Oct. 5, 1998

(87) PCT Pub. No.: WO98/40203

PCT Pub. Date: Sep. 17, 1998

(30) Foreign Application Priority Data

Mar. 10, 1998 (JP) .................................................... 9-70902

(51) Int. Cl.[7] .................................................... H02K 17/32

(52) U.S. Cl. .......................... 318/434; 318/432; 318/433; 318/930; 318/635

(58) Field of Search .................................... 318/434, 432, 318/438, 930, 635; 364/474.17, 474.12

(56) References Cited

U.S. PATENT DOCUMENTS

| | | | | |
|---|---|---|---|---|
| 4,852,434 | * 8/1989 | Bald | ..................................... | 318/569 |
| 5,265,590 | * 11/1993 | Takagi | ................................. | 318/138 |
| 5,509,847 | * 4/1996 | Jinno et al. | ..................... | 364/474.17 |
| 5,555,178 | * 9/1996 | Hashimoto | ...................... | 364/474.17 |
| 5,690,577 | * 11/1997 | Enzmann et al. | .................... | 318/138 |

FOREIGN PATENT DOCUMENTS

| | | |
|---|---|---|
| 4-210899 | 7/1992 | (JP) . |
| 6-31499 | 2/1994 | (JP) . |

* cited by examiner

*Primary Examiner*—Karen Masih
(74) *Attorney, Agent, or Firm*—Staas & Halsey LLP

(57) ABSTRACT

A torque command Tc is restricted to a torque limit value Tm' by torque limiting means and delivered to current restricting means for a motor. The torque limit value Tm' is derived by adding a torque limit correction value ΔTm as calculated by torque limit correction value calculating means to a torque limit value Tm corresponding to the target pressing force F. The torque limit correction value ΔTm is supplied in accordance with the acceleration value when the motor is accelerated or decelerated. This acceleration is calculated from the feedback velocity Vf from the velocity detector, or the command velocity Vc. Alternatively, it may be derived from the output of an observer which inputs the torque command Tc' supplied to the current control means of the motor, and the feedback velocity Vf.

9 Claims, 6 Drawing Sheets

PRESSING MACHINE AND MOTOR TORQUE CONTROL METHOD IN PRESSING MACHINE

FIELD OF THE INVENTION

The present invention relates to a pressing machine for conducting pressing by means of motor output torque and to a torque control method for a motor controlling this press.

DESCRIPTION OF THE RELATED ART

Pressing machines for conducting pressing by controlling pressing force by controlling the output torque of a motor, are commonly known. This conventional pressing force control obtains the required pressing force by applying a torque limit to the output torque of a motor, in other words, by restricting the output torque of the motor.

In this case, the torque limit value for the motor is derived from the intended pressing force and the static relationship between the torque generated by the motor and the pressing force. For example, if a simplified pressing machine as illustrated in FIG. 8 is considered, then assuming that the effect of friction is ignored, the static relationship between the torque T generated by the motor and the pressing force fp is given by Equation (1) below.

$$fp=a\cdot T \tag{1}$$

In this equation, a is a coefficient for converting rotational force to linear force.

Therefore, the torque Tm for obtaining the target pressing force F is given by the following equation, where fp=F and Tm=T in equation (1) above.

$$Tm=F/a \tag{2}$$

Therefore, if the output torque of the motor is limited to Tm, in other words, if the torque limit value is set to Tm, then the desired pressing force F can be obtained.

As described above, conventionally, a torque limit value Tm corresponding to the target pressing force F is derived from equation (2) above, and the required pressing force is obtained by driving the motor while restricting its output torque to this derived torque limit value Tm.

FIG. 9 is a control block diagram of a servo motor of a conventional pressing machine for conducting pressing by restricting the output torque of the servo motor where a servo motor is used as a motor. Velocity control means 1 implements velocity loop control, such as proportional plus integral control, or the like, in accordance with the instructed velocity command Vc and a velocity feedback value vf which is fed back from a position and velocity detector 6 for detecting the rotational position and velocity of a servo motor 5, and determines a torque command Tc. Thereupon, a torque command Tc' limited by torque limiting means 2, in which torque limit value Tm determined in equation (2) is set, is obtained, current control is implemented by current control means 3 in accordance with the torque command Tc', and the servo motor 5 is driven via an amplifierlifier 4.

If no pressing load is applied, the servo motor 5 will follow the command velocity Vc, without a large load being applied thereto, there will be no large velocity deviation between the command velocity Vc and velocity feedback value vf, so the torque command Tc output by velocity control means 1 will be a small value, and this torque command value Tc can be output without being restricted by the torque limiting means 2. In other words, Tc=Tc'.

If a metal pattern is placed on the work and a pressing load is applied, the velocity deviation will increase and the torque command Tc output by velocity command means 1 will increase and rise above the torque limit value Tm. However, since the torque command Tc having risen above the torque limit value Tm is restricted to the torque limit value Tm by torque limiting means 2, the torque command Tc' output by current control means 3 will be the torque limit value Tm. Thereby, the output torque of the servo motor will assume the toque limit value Tm, and the target pressing force F will be a Tm, according to equation (1) above (F=a·Tm).

However, in order to reduce noise during pressing, and the like, in some cases, pressing is conducted under deceleration. Furthermore, in some cases, pressing may be conducted under acceleration. In these cases, in the conventional motor control method described above, the required pressing force differs from the actual pressing force. Supposing that the acceleration of the motor is taken as a and the total mass of the moving body driven by the motor is taken as M, then if friction is ignored, the relationship between the pressing force fp (=pressing reaction) and the motor output torque T will be as shown in equation (3) below.

$$a\cdot T-fp=M\alpha \tag{3}$$

hence $$fp=a\cdot T-M\alpha \tag{3'}$$

However, if the motor output torque T is restricted to a torque limit value Tm(=F/a) corresponding to the target pressing force F, (in other words, T=Tm), then equation (3') above becomes $$fp=a\cdot Tm-M\alpha=F-M\alpha \tag{4}$$

In equation (4) above, if $\alpha<0$, in other words, when the motor is decelerating, the generated pressing force fp is greater than the target pressing force F(fp>F), and there is a possibility that the metal pattern will rupture. On the other hand, if $\alpha>0$, in other words, when the motor is accelerating, the generated pressing force fp is smaller than the target pressing force F(fp<F), so the required pressing force will not be obtained.

SUMMARY OF THE INVENTION

It is an object of the present invention to provide a pressing machine and a motor torque control method for a pressing machine, whereby the required pressing force can be obtained during acceleration or deceleration also.

The present invention is a motor torque control method for a pressing machine which applies pressing force by limiting the output torque of a motor by restricting a torque command through torque limiting means provided in a motor control circuit, wherein a torque limit value corresponding to a target pressing force is corrected by the torque required for acceleration or deceleration, and the motor is driven whilst the torque command value is restricted by this corrected torque limit value, such that the target pressing force is applied to a work during acceleration or deceleration.

The torque required for acceleration or deceleration is determined by the actual velocity detected by a velocity detector or the acceleration as calculated from the velocity command, and this is taken as a torque limit correction value. Alternatively, an observer for estimating acceleration from the torque command value and the actual velocity detected by a velocity detector is provided, and the acceleration estimated by the observer is taken as the aforementioned necessary torque for acceleration or deceleration, and this is taken as the torque limit correction value.

Since the present invention corrects the torque limit value corresponding to the target pressing force by the torque required for acceleration or deceleration and takes this as a torque limit value for restricting the torque command, it is possible to apply the target pressing force to a work at all times, during acceleration and deceleration also. Consequently, instances of the metal pattern rupturing due to application of excessive pressing force to the work, or of insufficient pressing force, do not occur.

BEST MODE FOR CARRYING OUT THE INVENTION

The motor control method in one embodiment of the present invention is now described with reference to the block diagram in FIG. 1.

Figure 1:
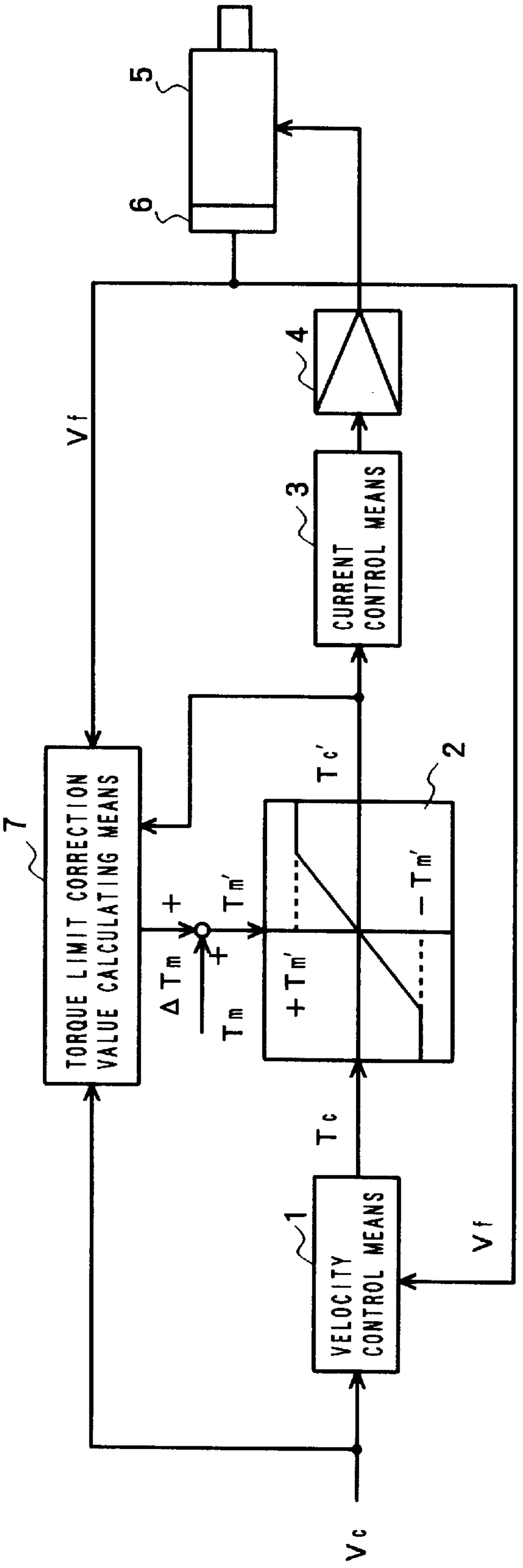
FIG. 1 is a block diagram of a motor control method according to one embodiment of the present invention.
Figure 9:
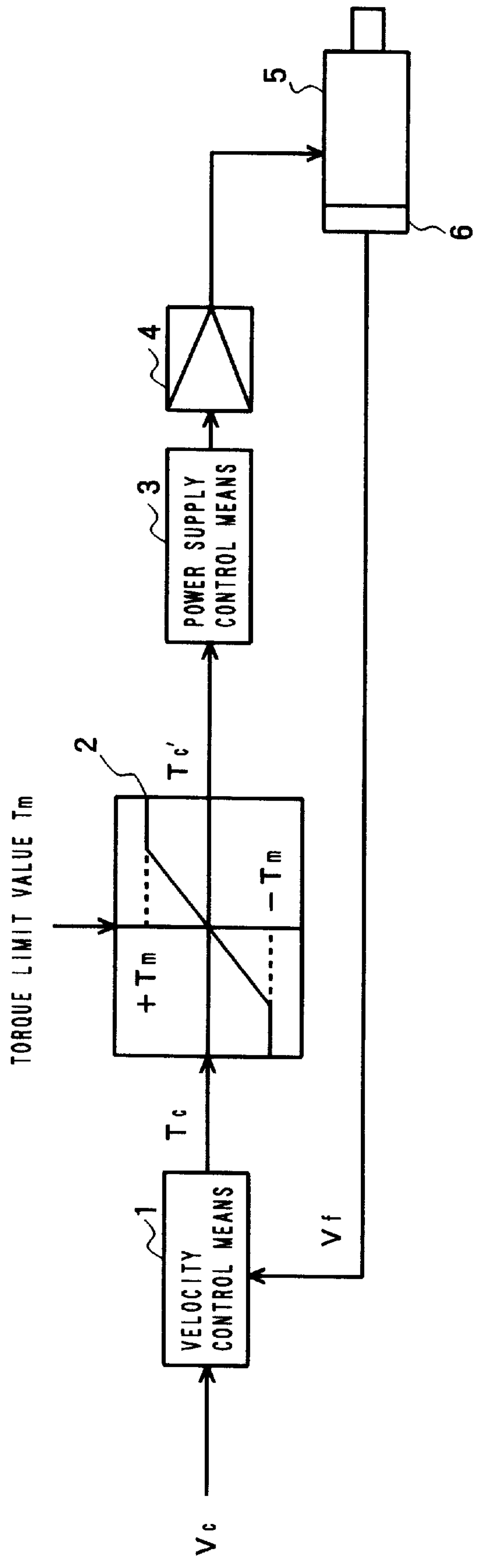
FIG. 9 is a block diagram of a motor control method for a conventional pressing machine.

The motor control method illustrated in FIG. 1 is characterized in that torque limit correction value calculating means 7 described hereinafter is appended to the conventional motor control method illustrated in FIG. 9.

Torque limiting means 2 inputs a torque limit value Tm'(=Tm+ΔTm) obtained by adding a torque limit correction value ΔTm as determined by torque limit correction value calculating means 7 to a torque limit value Tm corresponding to the target pressing force F as calculated by equation (2) above (hereinafter, this torque limit value Tm is called the static torque limit value). As described later, by correcting the torque required for acceleration or deceleration by means of the torque limit correction value ΔTm, the motor is controlled such that the set pressing force F is obtained.

The torque command Tc is restricted by the revised torque limit value Tm', which is revised by adding the torque limit correction value ΔTm to the static torque Tm(Tm+ΔTm), and if the servo motor is driven by this restricted torque command Tc'(=Tm'), then the pressing force Fp will be given by equation (5) below, where T=Tm+ΔTm is inserted in equation (3') above.

$$fp=a(Tm+\Delta Tm)-M\alpha \qquad (5)$$

In the equation above, Tm is a static torque limit value corresponding to the target pressing force F, and from equation (2) above, Tm=F/a. In other words, it is determined by the target pressing force F and the coefficient, a, which converts rotational force to linear force. Accordingly, equation (5) above is rewritten as equation (6) below.

$$fp=a(F/a+\Delta Tm)-M\alpha=F+a\cdot\Delta Tm-M\alpha \qquad (6)$$

In order that the pressing force fp shown in equation (6) above becomes the target pressing force F(fp=F), the following relationship should be satisfied:

$$a\cdot\Delta Tm-M\alpha=0 \qquad (6')$$

Therefore, the torque limit correction value ΔTm in equation (6') can be determined from equation (6") below. This calculation is carried out by torque limit correction value calculating means 7.

$$\Delta Tm=M\alpha/a \qquad (6")$$

In equation (6") above, the value of M is already known, since it is the total mass of the moving body, and the value of a is also an already known constant which may be derived by experimentation, or the like, since it is a coefficient for converting rotational force to linear force. Therefore, if the acceleration α of the motor is detected, it is possible to determine the torque limit correction value ΔTm from equation (6") above.

Supposing that the motor follows the velocity command Vc closely, the acceleration α can be determined by differentiating the velocity command Vc with respect to time. Alternatively, it may be determined by differentiating the velocity feedback value Vf fed back by the position and velocity detector 6, with respect to time. Moreover, by using an observer, it may be estimated from the torque command Tc' output by torque limiting means 2 (in other words, the torque command transferred to current control means 3 of the current loop) and the velocity feedback value Vf.

FIG. 1 shows a case where torque limit correction value calculating means 7 receives three inputs, namely, a velocity command Vc, velocity feedback value Vf, and torque command value Tc' which is output by torque limiting means 2. However, as described previously, not all three inputs Vc, Vf and Tc' are required in order to determine the acceleration α in torque limit correction value calculating means 7, and therefore, FIG. 1 should be interpreted as showing that torque limit correction value calculating means 7 inputs either velocity command Vc, velocity feedback value Vf, or torque command Tc' plus velocity feedback value Vf.

Next, a concrete example of torque limit correction value calculating means 7 is described with reference to the block diagrams in FIG. 2–FIG. 4.

Figure 2:
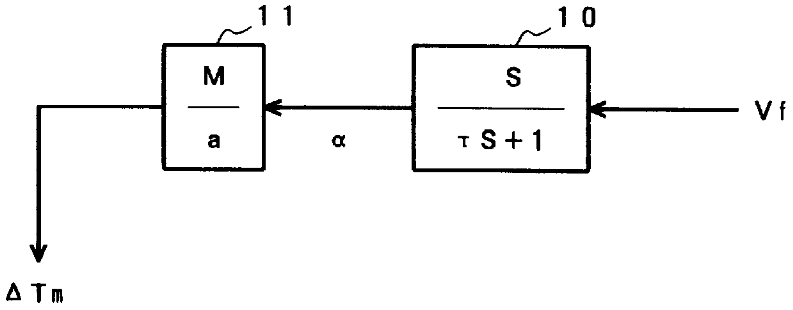
FIG. 2 is one examplifierle of torque limit correction value calculating means according to the same embodiment.

In the torque limit correction value calculating means in FIG. 2, the torque limit correction value ΔTm is determined from the velocity feedback value Vf. Here, the velocity feedback Vf is pseudo-differentiated using a low-pass filter 10 to obtain the acceleration α, and this acceleration α is multiplied by a coefficient (M/a) and a multiplier 11 to derive a torque limit correction value (=Mα/a).

Figure 3:
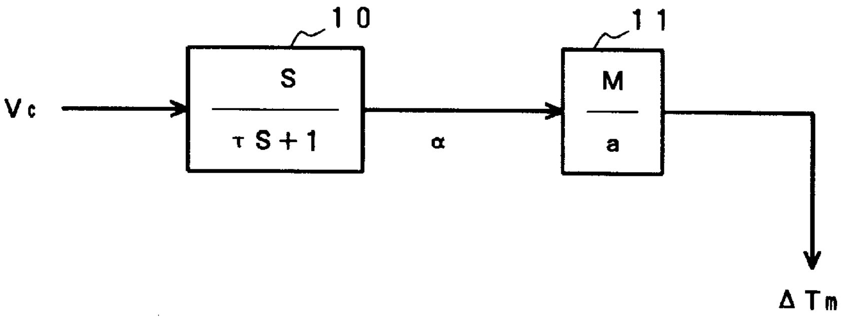
FIG. 3 is a further examplifierle of torque limit correction value calculating means according to the same embodiment.

Furthermore, in the torque limit correction value calculating means in FIG. 3, the torque limit correction value ΔTm is determined from the command velocity Vc. Here, the acceleration α by pseudo-differentiation of the command velocity value Vc using a low-pass filter 10, and this acceleration $\alpha$ is multiplied by a coefficient (M/a) to derive the torque limit correction value $\Delta Tm(=M\alpha/a)$.

Figure 4:
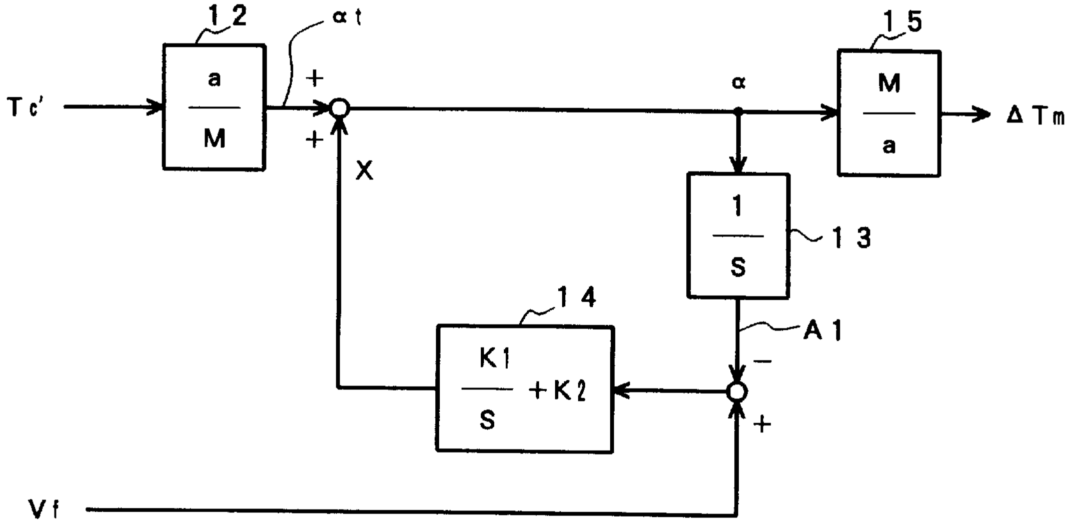
FIG. 4 is an examplifierle of torque limit correction value calculating means based on an observer according to the same embodiment.

In the torque limit correction value calculating means in FIG. 4, an observer is used. This observer estimates the acceleration $\alpha$ from the velocity feedback value Vf and the torque command Tc' output by current control means 3, and the torque limit correction value $\Delta Tm$ is derived from this estimated acceleration $\alpha$.

In the observer in FIG. 4, the motor torque acceleration $\alpha t$ is determined by multiplying the torque command Tc' by a/M at a multiplier 12. Moreover, the difference (Vf−A1) between the velocity feedback value Vf and the estimated acceleration (output of integrator 13:A1) is given integral plus proportional processing in section 14 to derive an estimated disturbance acceleration X. This processing is description below. The estimated acceleration $\alpha$ is found by adding this estimated disturbance acceleration X to the motor torque acceleration $\alpha t$. Moreover, the torque limit correction value $\Delta Tm$ is determined by multiplying the estimated acceleration $\alpha$ by M/a at a multiplier 15. The aforementioned estimated velocity (A1) is obtained by integration of the estimated acceleration $\alpha$ by integrator 13.

Next, the control section of a pressing machine in the present embodiment is described with reference to the block diagram in FIG. 5.

Figure 5:
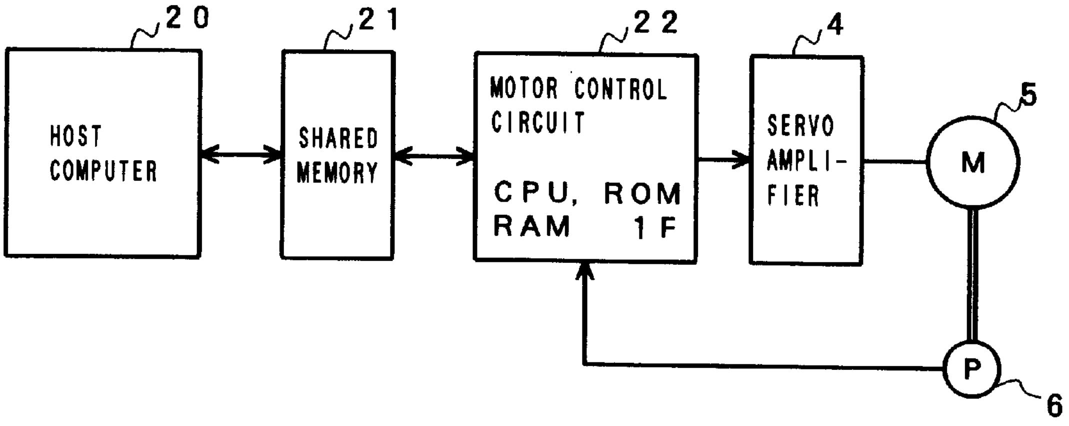
FIG. 5 is a block diagram of a control section of a pressing machine for implementing the same embodiment.
Figure 8:
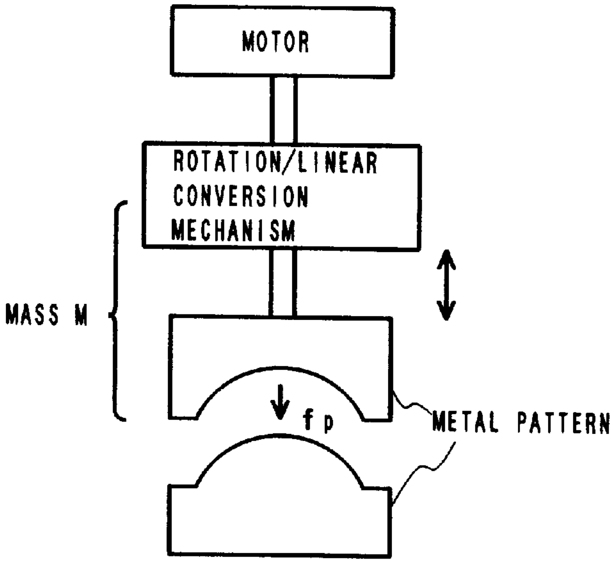
FIG. 8 is an approximate diagram of a pressing machine.

In FIG. 5, reference numeral 20 denotes a host computer, such as an NC controller, or the like, which outputs movement commands, etc. on the basis of an operating program via a shared memory 21 to a motor control circuit 22, which is a digital servo circuit for controlling a servo motor. Similarly to a conventional digital servo circuit, this motor control circuit 22 comprises a processor, memories, such as a ROM and a RAM, and an interface for inputting feedback values of position and velocity, fed back from position and velocity detector 6, and feedback values for the motor drive current, via servo amplifier 4, and the like, and it implements loop control of position, velocity and current, thereby driving and controlling a servo motor 5 via an amplifier 4. The position and velocity detector 6 is installed on the rotor shaft of the servo motor 5 and detects the rotational position and velocity of the servo motor, which it feeds back to the motor control circuit 22. The composition and operation of this control section is commonly known in the prior art, but the present invention is characterized in that, in the loop control of position, velocity and current by the aforementioned motor control circuit 22, a torque limit value is calculated for applying a torque limit to the torque command output by the velocity loop control, and the torque command is restricted by this derived torque limit value and output to the current loop.

Figure 6:
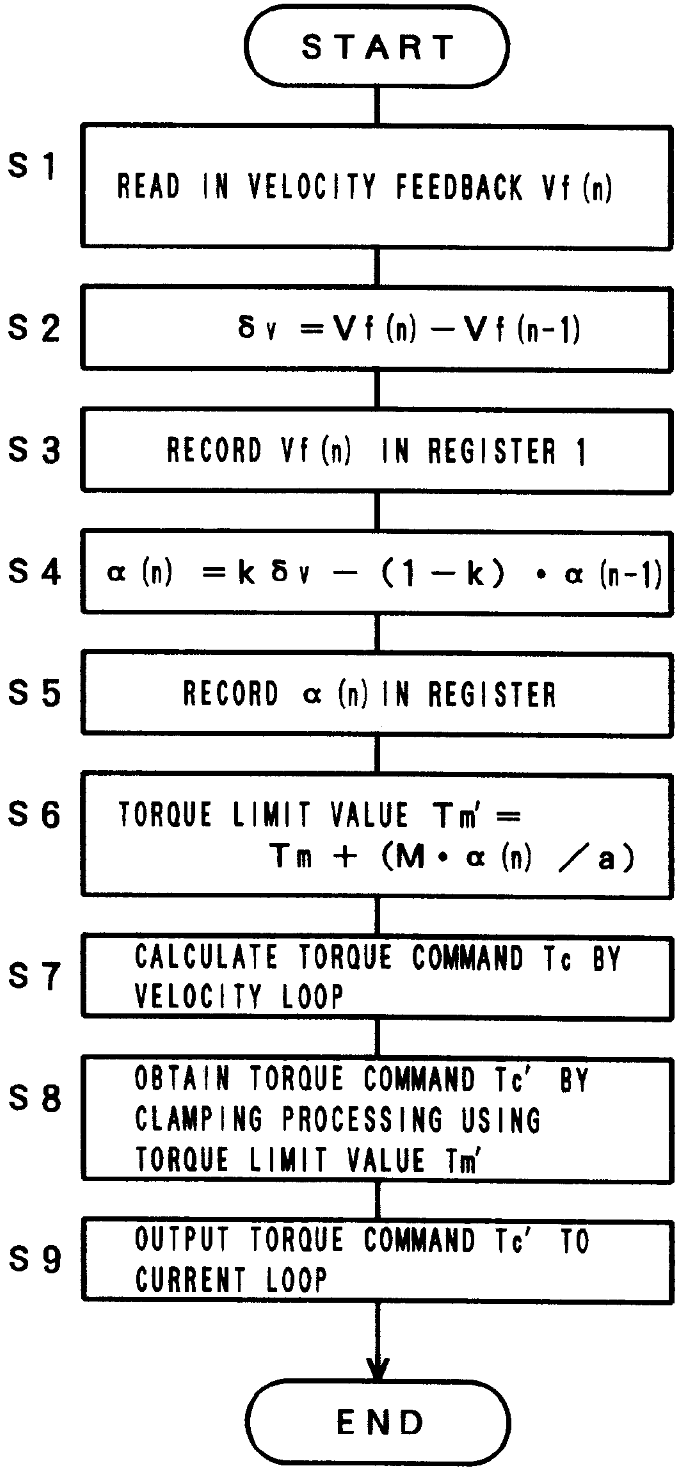
FIG. 6 is a flowchart of processing for each velocity loop processing cycle, centred on processing for determining a torque command to a current loop by applying torque limit processing according to the same embodiment.

The processing implemented by the processor in the motor control circuit 22 in FIG. 5 for each velocity loop processing cycle is described by referring to the flowchart in FIG. 6. In this processing, torque limit processing is conducted by determining a torque limit correction value $\Delta Tm$ according to the velocity feedback value, Vf, using the torque limit calculating means shown in FIG. 2, and a torque command Tc' for supply to the current loop is determined thereby. The static torque limit value Tm corresponding to the target pressing force F is calculated by equation (2) from the target pressing force F and coefficient a which converts rotational force to linear force (Tm=F/a), and Tm is set in the motor control circuit 22. The coefficient M/a in the multiplier 11 in FIG. 2 for determining the torque limit correction value from the acceleration is derived and set from the total mass of the moving body M and the aforementioned coefficient, a.

Firstly, the velocity feedback value Vf(n) for the cycle in question is read in (step S1), and, from this velocity feedback value Vf(n), the velocity feedback value Vf(n−1) for the previous cycle, which is recorded in a register, is subtracted from this velocity feedback value Vf(n) to derive a velocity differential $\delta v$ (step S2). Moreover, the velocity feedback value Vf(n) for the current cycle read in at step S1 is stored in a register 1 to be used as the previous cycle velocity feedback value Vf(n−1) in the subsequent cycle (step S3). Thereupon, by implementing low-pass filter processing according to the following equation (7), the acceleration $\alpha(n)$ for the current cycle is derived from the velocity differential, $\delta v$, determined at step S2 and the previous cycle acceleration $\alpha(n-1)$ stored in register 2 (step S4).

$$\alpha(n)=k\cdot\delta v+(1-k)\cdot\alpha(n-1) \tag{7}$$

In equation (7) above, $$k=\exp(-2\pi\cdot fc\cdot ts)$$

where fc is the cut-off frequency of the filter and ts is the sample time, which represents the velocity loop processing cycle. If k=0, then this is equivalent to an unfiltered state.

The acceleration $\alpha(n)$ determined in this way is stored in register 2 to be used as the previous cycle acceleration $\alpha(n-1)$ in the subsequent cycle (step S5). Using equation (6''') above, the torque limit correction value $\Delta Tm$ can be determined from the acceleration $\alpha(n)$ determined at step S4 ($\Delta Tm=\alpha(n)\cdot M/a$). Here, as described above, M/a is set previously in the motor control circuit 22.

Next, the torque limit value Tm' is determined by adding the torque limit correction value $\Delta Tm$ to the previously derived static torque limit value Tm. In other words, the following calculation is implemented (step S6):

$$Tm'=Tm+\Delta Tm=Tm+M\cdot\alpha(n)/a$$

Moreover, a torque command Tc is determined by carrying out conventional velocity loop processing using the velocity command Vc derived by positional loop processing and the velocity feedback value Vf (step S7).

The torque command Tc determined here is compared with the torque limit value Tm' determined at step S6, and if the torque command Tc is the smaller, the torque command Tc is delivered directly to the current loop as the torque command Tc' for the current loop. Furthermore, if the torque command Tc is larger than the torque limit value Tm', then this torque limit value Tm' becomes the torque command Tc' for the current loop, and the torque command restricted to this torque limit value Tm' is delivered to the current loop, whereupon the processing of the velocity loop ends (steps S8, S9).

Since the acceleration $\alpha$ is determined from the velocity feedback value Vf, the force required for acceleration or deceleration is determined from this acceleration $\alpha$, and the torque limit value is corrected by removing the effects of this force such that the set target pressing force F is obtained at all times, then even if the metal pattern is placed against a work and pressing is carried out during acceleration or deceleration, it is possible to press the work with the set target pressing force F.

In this way, in FIG. 2, the acceleration $\alpha$ is determined from the velocity feedback value Vf, the torque limit correction value $\Delta Tm$ is determined from this derived acceleration $\alpha$, and torque limit processing is carried out on the basis of this torque limit value $Tm'(=Tm+\Delta Tm)$. On the other hand, in FIG. 3, the acceleration $\alpha$ is determined from the velocity command Vc instead of the velocity feedback value Vf, the torque limit correction value ΔTm is determined from this derived acceleration α, similarly to the process in FIG. 2, and torque limit processing is carried out on the basis of the torque limit value Tm'(=Tm+ΔTm).

Therefore, the processing implemented by the processor in the motor control circuit 22 using the torque limit correction value calculating means shown in FIG. 3 simply involves reading out the command velocity Vc(n) instead of Vf(n) at step S1 in FIG. 6, whereupon Vf(n) is replaced by Vc(n) in steps S1–S3, so the processing is virtually the same as that in FIG. 6. Therefore, further description of the processing involved in FIG. 3 is omitted here.

Figure 7:
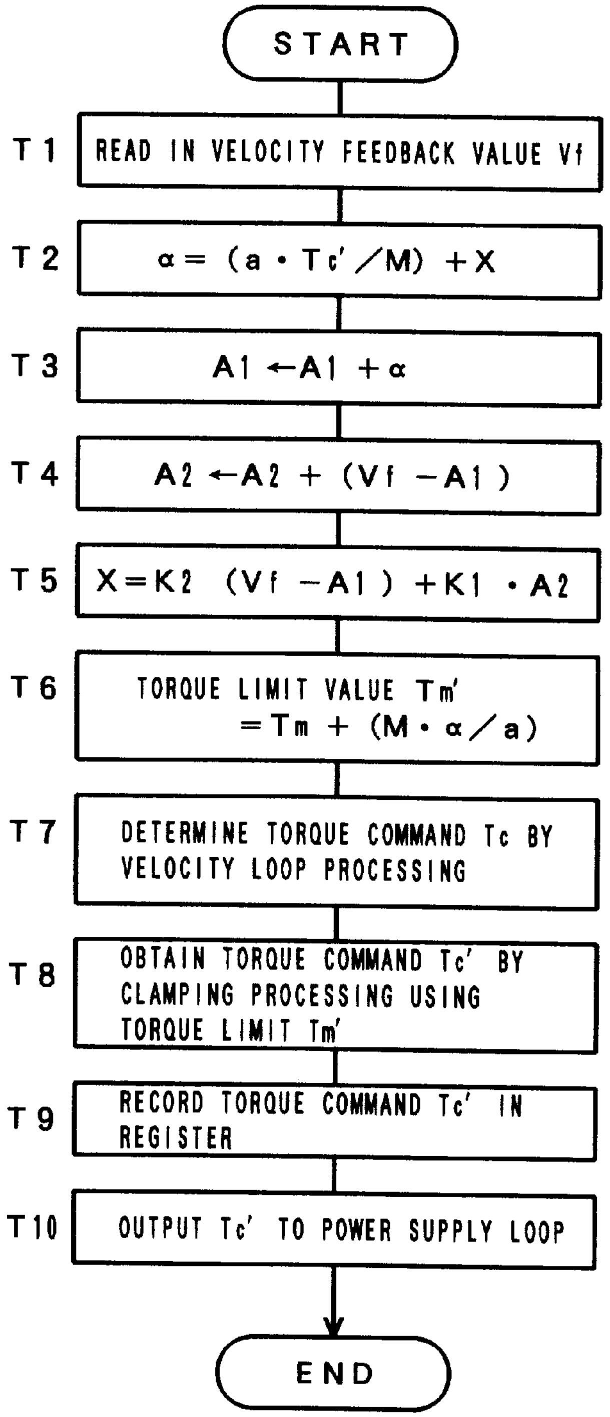
FIG. 7 is a flowchart of processing for each velocity loop processing cycle, centred on processing for determining a torque command for the current loop by correcting a torque limit value by means of observer processing.

Next, described using the flowchart in FIG. 7 is a processing, where the acceleration is estimated by means of an observer shown in FIG. 4, the torque limit correction value ΔTm is determined from this estimated acceleration, and a torque limit value Tm'(=Tm+ΔTm) is obtained by adding the static torque limit value Tm to the torque limit correction value ΔTm, and the motor is controlled accordingly. This processing is carried out for each processing cycle of the velocity loop.

Firstly, the total mass of the moving body M, the coefficient, a, for converting rotational force to linear force, the static torque limit value Tm(=F/a) corresponding to the target pressing force F, and the integration gain k1 and proportional gain k2 used for determining the estimated disturbance acceleration X, are set in a memory of the servo control circuit 22.

Thereupon, after reading the acceleration feedback value Vf (step T1), the torque command value Tc' for the previous cycle (that is, torque command value instructed to current loop after implementation of torque limiting), which is stored in register 1, and the estimated disturbance acceleration X are read, and an estimated acceleration α is determined by adding the estimated disturbance acceleration X to the product of torque command value Tc' and a/M (step T2).

Next, the estimated velocity (A1) is determined by multiplying the estimated acceleration α by the value of the accumulator A1. In other words, the processing of integrator 13 in FIG. 4 is implemented (step T3). A velocity differential δv is determined by subtracting the estimated velocity (A1), which is the value of the aforementioned accumulator A1, from the velocity feedback value Vf read at step T1, and this velocity differential δv is added to the accumulator A2 (step T4). An estimated disturbance acceleration X is determined by adding the product of the aforementioned velocity differential δv(=Vf–A1) and proportional gain k1 to the product of the value of accumulator A2 and integral gain k2, and the value of X is stored in register 2 (step T5). In other words, the processing in step T5 is equivalent to the processing of proportional plus integral processing means 14 in FIG. 4.

Thereupon, a torque limit value Tm'(=Tm+M·α/a) is determined by adding the product of the estimated acceleration α determined at step T2 above and the set value (M/a) to the previously determined static torque limit value Tm (step T6).

Moreover, a torque command Tc is determined by velocity loop processing, similarly to the prior art, in accordance with the velocity command Vc determined by positional loop processing and the velocity feedback value Vf (step T7). The torque command Tc is compared with the torque limit value Tm' derived at step 6, and if the torque command Tc is smaller, it is taken directly as the torque command Tc' for the current loop, whereas if the torque command Tc is the larger, hen the torque limit value Tm' is stored as the torque command Tc' in a register, and it is also delivered to the current loop processing (steps T8–T10). Thereafter, the above processing is repeated for each velocity loop processing cycle.

Thereby, the torque command is corrected by a value corresponding to the torque required for acceleration or deceleration, and control is implemented such that the target pressing force is obtained.

What is claimed is:

1. A motor torque control method for a pressing machine for applying a prescribed pressing force by restricting the output torque of a motor, comprising:

estimating an acceleration based on a torque command and a velocity of the motor detected by a velocity detector;

correcting a torque limit value corresponding to a target pressing force by a torque value required for acceleration or deceleration of the motor, using the estimated acceleration; and restricting a torque command value to said motor by said corrected torque limit value, and applying the prescribed pressing force to a work while accelerating or decelerating said motor.

2. The motor torque control method for a pressing machine according to claim 1, wherein the torque value required for acceleration or deceleration of said motor is determined from an acceleration as calculated from an actual velocity of the motor detected by a velocity detector.

3. The motor torque control method for a pressing machine according to claim 1, wherein the torque value required for acceleration or deceleration of said motor is determined from an acceleration as calculated from a velocity command.

4. The motor torque control method for a pressing machine according to claim 1, wherein the torque value required for acceleration or deceleration of said motor is determined from an estimated acceleration output by an observer, and furthermore, said observer inputs an actual velocity detected by a velocity detector and a torque command delivered to the current loop, and outputs an estimated acceleration.

5. A pressing machine for applying pressing force, comprising:

a torque limiting device restricting torque commands in a motor control circuit, whereby the output torque of a motor is restricted by restricting torque commands through said torque limiting device; and a torque limit correction value calculating device determining an acceleration from a command velocity or a detected velocity from a velocity detector for detecting velocity of the motor, and calculating a torque limit correction value from said acceleration, wherein the torque limit value of said torque limiting device is derived by adding the torque limit correction value determined by said torque limit correction value calculating device to a torque limit value corresponding to a target pressing force.

6. A pressing machine for applying pressing force, comprising:

a torque limiting device restricting torque commands in a motor control circuit, in which the output torque of a motor is restricted by restricting torque commands through said torque limiting device;

an observer for estimating and outputting acceleration values, wherein said observer inputs the actual velocity as detected by a velocity detector and a torque command delivered to the current loop, and outputs a estimated acceleration; and a calculating device calculating a torque value required for acceleration or deceleration from the estimated acceleration output by said observer, and outputting this calculated torque value to said torque limiting device, wherein the torque limit value of said torque limiting device is derived by adding the torque value required for acceleration or deceleration as calculated from the output of said observer to a torque limit value corresponding to a target pressing force.

7. A motor control circuit for implementing loop control of position, velocity and current, which inputs movement commands based on an operating program, and feedback signals from a position and velocity detector installed on a rotor shaft of a motor, comprising:

a torque limiting device applying a torque limit to a torque command generated by velocity loop control, the torque required to cause a prescribed force to act on a machine driven by a motor operated at constant speed being previously set as a static torque limit value in said torque limiting device; and a torque limit correction value calculating device correcting the torque limit value of said torque limiting device, such that said prescribed force acts on said machine, even when the motor is operates at a certain acceleration, the torque limit value of said torque limiting device being corrected by detecting the acceleration of a motor, determining a torque limit correction value from this detected acceleration, and adding this torque limit correction value to said static torque limit value.

8. A motor control apparatus controlling an output torque of a motor comprising:

a velocity detector detecting a velocity of the motor;

an observer estimating an acceleration based on a torque command and the velocity of the motor; and a torque correcting device, upon acceleration or deceleration of the motor as determined by input from the velocity detector, correcting the torque to correspond with a target pressing force using the estimated acceleration.

9. A method of controlling an output torque of a motor, comprising:

detecting a velocity of the motor;

estimating an acceleration based on a torque command and the velocity of the motor; and correcting, upon acceleration or deceleration of the motor, the torque to correspond with a target pressing force using the estimated acceleration.

* * * * *

UNITED STATES PATENT AND TRADEMARK OFFICE
CERTIFICATE OF CORRECTION

PATENT NO. : 6,211,636 B1
DATED : April 3, 2001
INVENTOR(S) : Shunsuke Matsubara et al.

It is certified that error appears in the above-identified patent and that said Letters Patent is hereby corrected as shown below:

Title page,
Item [75], change "Minamitsuru-gun" to -- Yamanashi --; and change "Oshino-mura" to -- Yamanashi --.
Item [30], change "March 10, 1998" to -- March 10, 1997 --.

Column 1,
Line 59, change "amplifierlifier" to -- amplifier --.

Column 2,
Line 18, change "a" to -- α --.

Column 3,
Lines 17, 19 and 21, change "examplifierle" to -- example --.
Line 40, change "BEST MODE FOR CARRYING OUT THE INVENTION" to -- DESCRIPTION OF THE PREFERRED EMBODIMENTS --.

Column 5,
Line 16, change "description" to -- described --.

Column 7,
Line 63, change "6" to -- T6 --.
Line 66, change "hen" to -- then --.

Signed and Sealed this

Fourteenth Day of May, 2002

*Attest:*

JAMES E. ROGAN
*Director of the United States Patent and Trademark Office*

*Attesting Officer*

UNITED STATES PATENT AND TRADEMARK OFFICE

CERTIFICATE OF CORRECTION

PATENT NO. : 6,211,636 B1
DATED : April 3, 2001
INVENTOR(S) : Shunsuke Matsubara et al.

It is certified that error appears in the above-identified patent and that said Letters Patent is hereby corrected as shown below:

Title page,
Item [30], change "March 10, 1998" to -- March 10, 1997 --.

Column 1,
Line 59, change "amplifierlifier" to -- amplifier --.

Column 2,
Line 18, change "a" to -- α --.

Column 3,
Lines 17, 19 and 21, change "examplifierle" to -- example --.
Line 40, change "BEST MODE FOR CARRYING OUT THE INVENTION" to -- DESCRIPTION OF THE PREFERRED EMBODIMENTS --.

Column 5,
Line 16, change "description" to -- described --.

Column 7,
Line 63, change "6" to -- T6 --.
Line 66, change "hen" to -- then --.

This certificate supersedes Certificate of Correction issued May 14, 2002.

Signed and Sealed this

Twenty-fifth Day of March, 2003

JAMES E. ROGAN
*Director of the United States Patent and Trademark Office*